US012306708B2

(12) United States Patent
Thiruchengode Vajravel et al.

(10) Patent No.: US 12,306,708 B2
(45) Date of Patent: May 20, 2025

(54) MANAGING UNRECOVERABLE ERRORS FOR DATA PROCESSING SYSTEMS USING OUT OF BAND COMMUNICATION CHANNELS

(71) Applicant: Dell Products L.P., Round Rock, TX (US)

(72) Inventors: Gokul Thiruchengode Vajravel, Bangalore (IN); Abeye Teshome, Austin, TX (US); Vinodkumar Vasudev Ottar, Mckinney, TX (US); Bassem El-Azzami, Austin, TX (US); Mohit Arora, Frisco, TX (US); Adolfo Sandor Montero, Pflugerville, TX (US); Richard M. Tonry, Georgetown, TX (US); Rajaravi Chandra Kollarapu, Allen, TX (US); Luis Antonio Valencia Reyes, Waxahachie, TX (US)

(73) Assignee: Dell Products L.P., Round Rock, TX (US)

( * ) Notice: Subject to any disclaimer, the term of this patent is extended or adjusted under 35 U.S.C. 154(b) by 38 days.

(21) Appl. No.: 18/498,279

(22) Filed: Oct. 31, 2023

(65) Prior Publication Data
US 2025/0138936 A1    May 1, 2025

(51) Int. Cl.
*G06F 11/00*     (2006.01)
*G06F 11/07*     (2006.01)

(52) U.S. Cl.
CPC ...... *G06F 11/0793* (2013.01); *G06F 11/0778* (2013.01); *G06F 2201/84* (2013.01)

(58) Field of Classification Search
CPC ............ G06F 11/0778; G06F 11/0793; G06F 2201/84
See application file for complete search history.

(56) References Cited

U.S. PATENT DOCUMENTS

| | | | | |
|---|---|---|---|---|
| 5,283,905 A | * | 2/1994 | Saadeh | H02J 9/061 714/22 |
| 5,367,670 A | * | 11/1994 | Ward | G06F 11/2294 714/E11.201 |
| 5,402,431 A | * | 3/1995 | Saadeh | G06F 11/349 714/E11.2 |
| 7,590,760 B1 | * | 9/2009 | Banks | G06F 11/2038 709/248 |
| 7,599,907 B2 | | 10/2009 | Havewala et al. | |

(Continued)

*Primary Examiner* — Joshua P Lottich
(74) *Attorney, Agent, or Firm* — WOMBLE BOND DICKINSON (US) LLP

(57) ABSTRACT

Methods and systems for managing unrecoverable errors for data processing systems are disclosed. Upon identifying that an unrecoverable error has occurred by hardware resources of a data processing system, a management controller for the data processing system may obtain a data package indicating at least an operating state of the hardware resources prior to the occurrence of the unrecoverable error. The management controller may utilize an out of band communication channel to provide the data package to a trusted management system. The management controller may obtain at least one action in response to the data package from the trusted management system, the at least one action being intended to initiate remediation of the unrecoverable error.

20 Claims, 6 Drawing Sheets

(56) References Cited

U.S. PATENT DOCUMENTS

| | | |
|---|---|---|
| 8,020,192 B2 | 9/2011 | Wright et al. |
| 8,490,163 B1 | 7/2013 | Harsell et al. |
| 8,850,186 B2 | 9/2014 | Yamauchi |
| 9,191,781 B2 | 11/2015 | Kumar |
| 9,246,678 B2 | 1/2016 | Nayshtut et al. |
| 9,349,009 B2 | 5/2016 | Rivera |
| 9,721,111 B2 | 8/2017 | Cavanaugh |
| 9,721,175 B2 | 8/2017 | Kursun et al. |
| 9,785,491 B2 | 10/2017 | Cilfone et al. |
| 10,021,669 B2 | 7/2018 | George |
| 10,163,105 B1 | 12/2018 | Ziraknejad et al. |
| 10,169,571 B1 | 1/2019 | Attfield et al. |
| 10,395,039 B2 | 8/2019 | Khatri et al. |
| 10,630,489 B2 | 4/2020 | Hughes |
| 10,678,555 B2 | 6/2020 | Johansson et al. |
| 10,841,295 B1 | 11/2020 | Pecen et al. |
| 11,563,565 B2 | 1/2023 | Yang et al. |
| 11,704,384 B2 | 7/2023 | Murphy et al. |
| 11,909,575 B1* | 2/2024 | Mehrotra .............. H04L 41/046 |
| 2003/0046394 A1* | 3/2003 | Goddard .............. H04L 69/161 |
| | | 709/251 |
| 2003/0131262 A1* | 7/2003 | Goddard ................ H04L 69/40 |
| | | 726/11 |
| 2004/0246893 A1* | 12/2004 | Ahrens, Jr. ........ H04L 43/0811 |
| | | 370/216 |
| 2013/0339302 A1 | 12/2013 | Zhang |
| 2013/0339303 A1 | 12/2013 | Potter |
| 2014/0317364 A1 | 10/2014 | Shepard |
| 2015/0067217 A1* | 3/2015 | Feehrer .............. G06F 11/0709 |
| | | 710/263 |
| 2015/0301880 A1 | 10/2015 | Allu |
| 2017/0139411 A1* | 5/2017 | Hartung ................. H04L 12/40 |
| 2017/0242605 A1 | 8/2017 | Suryanarayana |
| 2017/0277876 A1 | 9/2017 | Alameh et al. |
| 2017/0289197 A1 | 10/2017 | Mandyam et al. |
| 2018/0006829 A1 | 1/2018 | Kravitz et al. |
| 2018/0157525 A1* | 6/2018 | Song ..................... G06F 13/24 |
| 2018/0321719 A1* | 11/2018 | Munjal ............... G06F 11/3006 |
| 2019/0042372 A1 | 2/2019 | Kumar |
| 2019/0156019 A1 | 5/2019 | Chen |
| 2020/0371859 A1 | 11/2020 | Sayyed |
| 2021/0263868 A1* | 8/2021 | Maddukuri ......... G06F 11/0793 |
| 2022/0222328 A1 | 7/2022 | Talib et al. |
| 2023/0011379 A1* | 1/2023 | Thommana ....... H04W 72/0453 |

* cited by examiner

MANAGING UNRECOVERABLE ERRORS FOR DATA PROCESSING SYSTEMS USING OUT OF BAND COMMUNICATION CHANNELS

FIELD

Embodiments disclosed herein relate generally to managing data processing systems. More particularly, embodiments disclosed herein relate to systems and methods to manage unrecoverable errors for the data processing systems using at least an out of band communication channel.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
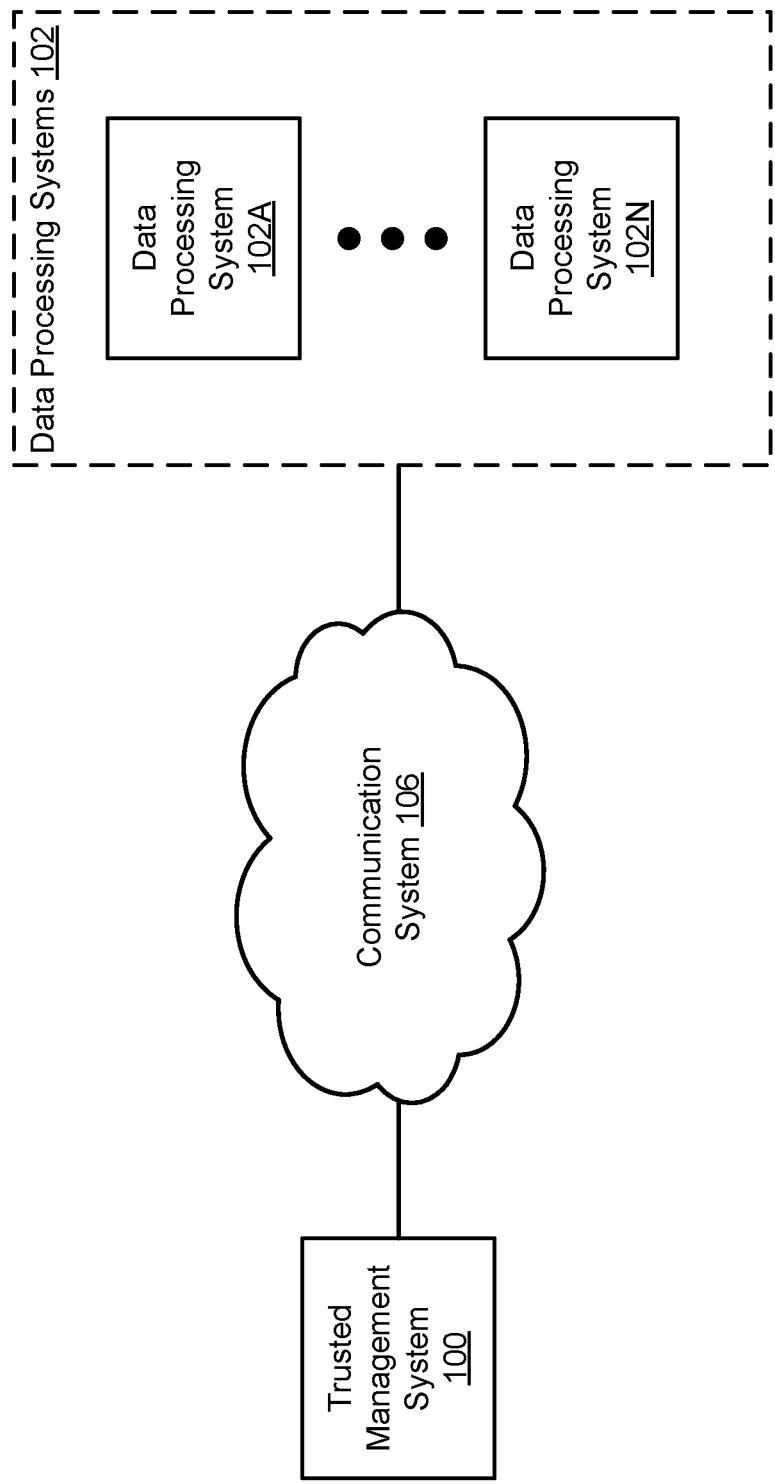
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. The data processing systems may provide computer-implemented services to any type and number of other devices and/or users of the data processing systems. The computer-implemented services may include any quantity and type of such services.

While providing, at least in part, the computer-implemented services, the data processing systems may encounter an error. The error may be recoverable (e.g., attempts to restart the data processing system may be successful following a crash of the data processing system) and/or may be unrecoverable (e.g., attempts to restart the data processing system may be unsuccessful following the crash of the data processing system).

In the event of a recoverable error, a user of the data processing system may successfully restart the data processing system and may not suffer loss of data, user configurations, and/or functionality of software applications hosted by hardware resources of the data processing system. Data regarding the recoverable error may have been recorded by the data processing system following the crash, and may be accessible to the user (e.g., and/or another entity) to potentially diagnose the cause of the recoverable error.

However, in the event of an unrecoverable error, the user may not be able to successfully restart the data processing system. Therefore, data and/or user configurations may be lost, and the computer-implemented services provided, at least in part, by the data processing system may be interrupted. The unrecoverable error may result in the data processing system no longer functioning properly and being unavailable for use by the user. Data regarding the unrecoverable error may have been recorded by the data processing system following the crash but may be inaccessible to the user (and/or another entity) for use in diagnosing the cause of the unrecoverable error.

Although the unrecoverable error may be attributed to a malfunction of a particular portion of software applications hosted by hardware resources of the data processing system, recovering functionality of the data processing system may include reinstalling all software applications hosted by the hardware resources. Doing so may remove user configurations and/or other information previously used by the software applications prior to the unrecoverable error. Consequently, being unable to selectively diagnose and remediate a source of the unrecoverable error may negatively impact the user experience and may interrupt availability of computer-implemented services provided by the data processing system To diagnose a cause of an unrecoverable error for a data processing system, embodiments disclosed herein relate to methods and systems for obtaining a data package including information related to the unrecoverable error by a management controller of the data processing system. The management controller may provide the data package to a trusted management system via an out of band communication channel and may subsequently obtain instructions from the trusted management system to remediate the unrecoverable error.

The management controller and a network module that manages communication channels for the data processing system may be powered separately from hardware resources of the data processing system. Therefore, the management controller may communicate with the trusted management system via the out of band communication channel (e.g., a communication channel not managed using any software compromised by the crash) to provide the data package to the trusted management system. The data package may indicate an operating state of hardware resources when the occurrence of the unrecoverable error occurred. Consequently, the trusted management system may use the data package to identify a source of the unrecoverable error and may provide the management controller with at least one action to selectively remediate the unrecoverable error through modification of a portion of the software applications hosted by the hardware resources of the data processing system.

By doing so, at least a portion of user configurations and other data used by software applications prior to the occurrence of the unrecoverable error may be recovered, thereby allowing for increased uptime of the data processing system for the user.

In an embodiment, a method of managing data processing systems is provided. The method may include: identifying, by a management controller of a data processing system of the data processing systems, an occurrence of an unrecoverable error by hardware resources of the data processing system; based on the identifying: obtaining, by the management controller and from the hardware resources, a data package indicating, at least, an operating state of the hardware resources when the occurrence of the unrecoverable error occurred; and providing, by the management controller and via an out of band communication channel, at least a portion of the data package to a trusted management system to initiate remediation of the unrecoverable error.

The method may also include: after providing the at least the portion of the data package: obtaining, by the management controller and via the out of band communication channel, at least one action for remediation of the unrecoverable error; and initiating, by the management controller, performance of the at least one action.

Identifying the occurrence of the unrecoverable error may include: identifying, by the management controller, at least one unsuccessful attempt to restart the data processing system after the occurrence of the unrecoverable error.

Identifying the occurrence of the unrecoverable error may include: obtaining, by the management controller, a message from an agent hosted by the hardware resources, the message indicating that a management entity of the hardware resources has suffered the unrecoverable error.

The management entity may be an operating system running in a virtualized environment hosted by the hardware resources, and the agent may be outside of the virtualized environment.

The data package may include: a snapshot of contents of memory of the hardware resources; and contents of a processor of the hardware resources.

The data package may also include: at least one log of activity of the hardware resources prior to the occurrence of the unrecoverable error.

The data processing system may include a network module adapted to separately advertise network endpoints for the management controller and the hardware resources, the network endpoints being usable by the storage system to address communications to the hardware resources and the management controller.

The management controller and the network module may be on separate power domains from the hardware resources so that the management controller and the network module are operable while the hardware resources are inoperable.

The out of band communication channel may run through the network module, and an in band communication channel that services the hardware resources may also run through the network module.

The management controller may host a transmission control protocol/internet protocol (TCP/IP) stack to facilitate network communications via the out of band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1B:
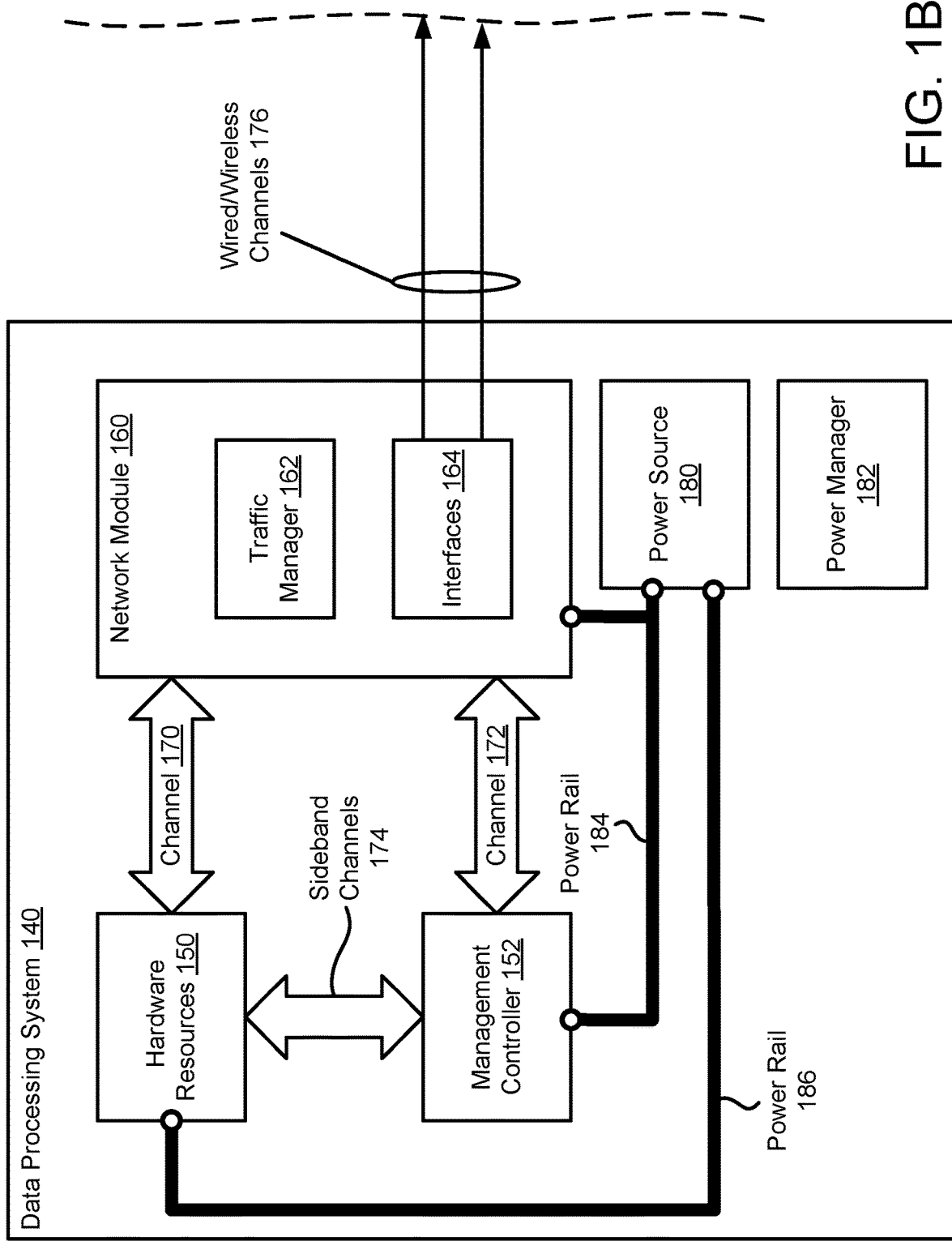
FIG. 1B shows a block diagram illustrating a data processing system in accordance with an embodiment.
Figure 1C:
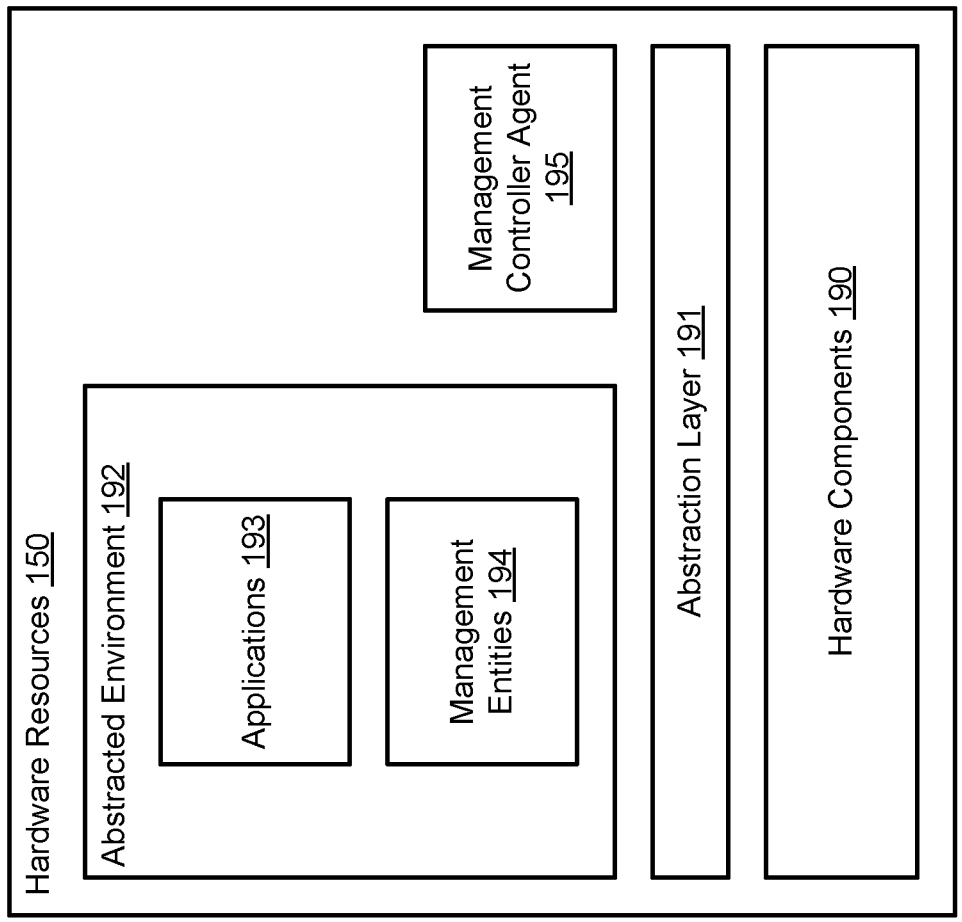
FIG. 1C shows a block diagram illustrating hardware resources of a data processing system in accordance with an embodiment.

Turning to FIG. 1A, a block diagram illustrating a system in accordance with an embodiment is shown. The system shown in FIG. 1A may provide for management of data processing systems that may provide, at least in part, computer-implemented services. The system may include any number of data processing systems 102 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time. Refer to FIGS. 1B-1C for additional details regarding data processing systems 102.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, trusted management system 100, data processing systems 102 and/or any other type of devices (not shown in FIG. 1A). Other types of computer-implemented services may be provided by the system shown in FIG. 1A without departing from embodiments disclosed herein.

While providing the aforementioned computer-implemented services (e.g., to owners of data processing systems 102 and/or by the owners of data processing systems 102), data processing systems 102 may be encounter errors (e.g., software application and/or operating system crashes). The errors may include a loss of functionality of one or more software applications hosted by hardware components of a data processing system of data processing systems 102 (e.g., 102A).

The errors may be recoverable errors (e.g., attempts to restart the data processing system may successfully restore functionality to the data processing system) and/or unrecoverable errors (e.g., attempts to restart the data processing system may be unsuccessful).

In a first example, an unrecoverable error may be caused by corruption of at least a portion of data used by an operating system of the data processing system and/or another management entity of the data processing system. The corruption of the at least a portion of the data may cause the operating system to lose access to the at least the portion of the data and, therefore, the operating system may be unable to start up and/or otherwise run successfully.

In a second example, the unrecoverable error may be caused by misconfiguration of settings for one or more hardware components of the hardware resources of the data processing system. Due to a lack of alignment between configurations for a hardware component during startup and the expected configurations for the hardware component, a startup entity (e.g., a basic input/output system (BIOS)) may be unable to function properly.

In the event that data processing system 102A, for example, encounters an error, data processing system 102A may generate a data package upon occurrence of the error. The data package may include: (i) a snapshot of contents of memory of hardware resources of data processing system 102A when the error occurred, (ii) contents of a processor of hardware resources of data processing system 102A, (iii) at least one log of activity of the hardware resources prior to the occurrence of the error, and/or (iv) other data related to an operating state of the hardware resources when the error occurred.

If the error is a recoverable error, the data package may be utilized by data processing system 102A to resume functionality of software applications hosted by the hardware resources upon restart of data processing system 102A. At least a portion of the data package may be available to a user of data processing system 102A and/or a management entity to identify a cause of the error.

However, if the error is an unrecoverable error, the data package may be stored by data processing system 102A but may be irretrievable by the user and/or the management entity. Consequently, a source of the unrecoverable error (e.g., a portion of software applications hosted by the hardware resources) may be unidentifiable. To remediate the unrecoverable error and regain use of data processing system 102A, at least a portion of the software applications may be uninstalled and reinstalled thereby losing user configurations and/or other individualized settings for the user. Doing so may result in increased downtime of data processing system 102A and, therefore, an interruption to computer-implemented services provided by and/or facilitated by data processing system 102A.

In general, embodiments disclosed herein relate to systems, devices, and methods for managing unrecoverable errors for data processing systems 102. To do so, a management controller of a data processing system that has encountered an unrecoverable error (e.g., 102A) may utilize an out of band communication channel to provide a data package related to the unrecoverable error to a trusted management system (e.g., trusted management system 100). The management controller may subsequently receive, in response to the data package, instructions to perform one or more remedial actions tailored to the source of the unrecoverable error.

The data package may indicate, at least in part, an operating state of hardware resources of data processing system 102A when the occurrence of the unrecoverable error occurred. Specifically, the data package may include: (i) a snapshot of contents of memory of the hardware resources, (ii) contents of a processor of the hardware resources, (iii) at least one log of activity of the hardware resources prior to the occurrence of the unrecoverable error, and/or (iv) other data.

The management controller and a network module responsible for directing network traffic to the out of band communication channel may be powered separately from hardware resources of data processing system 102A and, therefore, the management controller may perform actions and send and/or receive communications while the hardware resources of data processing system 102A are unpowered (and/or unusable due to the unrecoverable error).

By doing so, an unrecoverable error may be remediated without reinstalling software applications hosted by the hardware resources (e.g., which may result in loss of user configurations and/or other data for the software applications). By selectively remediating a portion of the software applications responsible for the unrecoverable error, time resources and computing resources may be conserved while increasing uptime of the data processing system for use by the user.

Trusted management system 100 may be implemented using a physical device that stores and manages data packages for data processing system 102. Data processing systems 102 may interact with trusted management system 100 to report errors and provide data packages related to the errors. Trusted management system 100 may obtain the data package and use the data package to diagnose a cause of the error. Following the diagnosis, trusted management system 100 may identify one or more actions to be performed to remediate the error and may provide the one or more actions to the management controller via an out of band communication channel of communication system 106.

Any of the components illustrated in FIG. 1A may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of any of data processing systems 102 and trusted management system 100).

Communication system 106 may include out of band communication channels, in band communication channels, and/or other types of communication channels.

Refer to FIGS. 1B-1C for additional details regarding the management controller, network module, out of band communication channel, and/or hardware resources of data processing systems 102.

Turning to FIG. 1B, a diagram illustrating data processing system 140 in accordance with an embodiment is shown. Data processing system 140 may be similar to any of the data processing systems 102 shown in FIG. 1A.

To provide computer-implemented services, data processing system 140 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources.

To facilitate communication, hardware resources 150 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communication with other entities. Refer to FIG. 1C for additional details regarding software entities that may be hosted by hardware resources 150.

However, use of the network stack and the services provided by the management entities may place the applications at risk of indirect compromise. For example, if any of these entities trusted by the applications are compromised, these entities may subsequently compromise the operation of the applications. Additionally, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

To reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a host data processing system 140). Management controller 152 may provide various management functionalities for data processing system 140. For example, management controller 152 may monitor various ongoing processes performed by the in-band component, may manage power distribution, thermal management, and/or other functions of data processing system 140.

To do so, management controller 152 may be operably connected to various components via sideband channels 174 (in FIG. 1B, a limited number of sideband channels are included for illustrative purposes, it will be appreciated that management controller 152 may communication with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

To provide its functionality, management controller 152 may: (i) identify an occurrence of an unrecoverable error by hardware resources 150, (ii) based on the identifying, obtain a data package from hardware resources 150, the data package indicating, at least, an operating state of hardware resources 150 when the occurrence of the unrecoverable error occurred, (iii) provide, via an out of band communication channel (e.g., 172), at least a portion of the data package to a trusted management system (not shown) to initiate remediation of the unrecoverable error, and/or (iv) perform other actions.

Further, after providing the at least the portion of the data package, management controller 152 may: (i) obtain, via the out of band communication channel, at least one action for remediation of the unrecoverable error, and/or (ii) initiate performance of the at least one action.

Management controller 152 may be operably connected to communication components of data processing system 140 via separate channels (e.g., 172) from the in-band components, and may implement or otherwise utilize a distinct and independent network stack (e.g., TCP/IP). Consequently, management controller 152 may communication with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 140 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2:
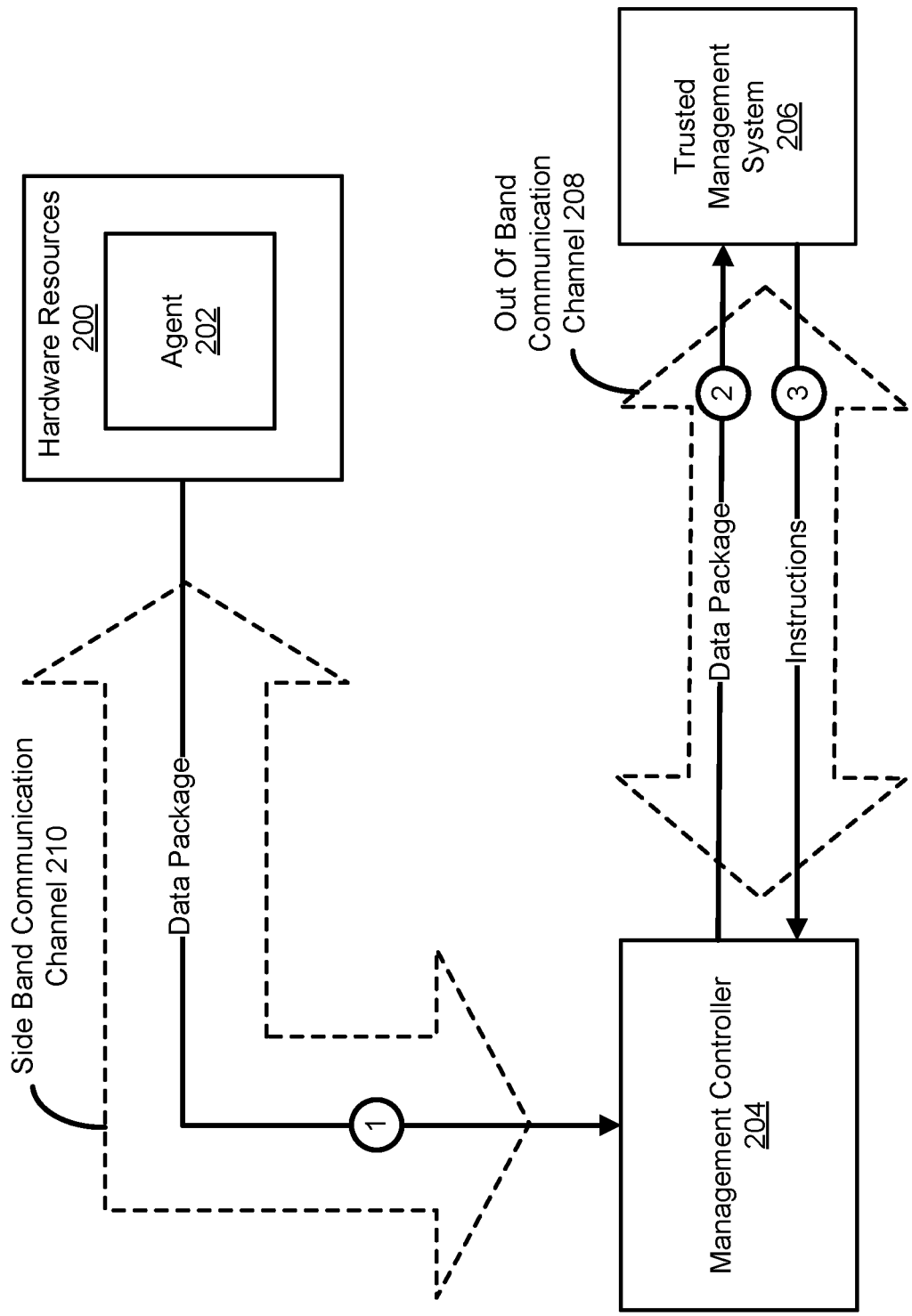
FIG. 2 shows a data flow diagram illustrating a management controller interacting with a trusted management system and hardware resources in accordance with an embodiment.
Figure 3:
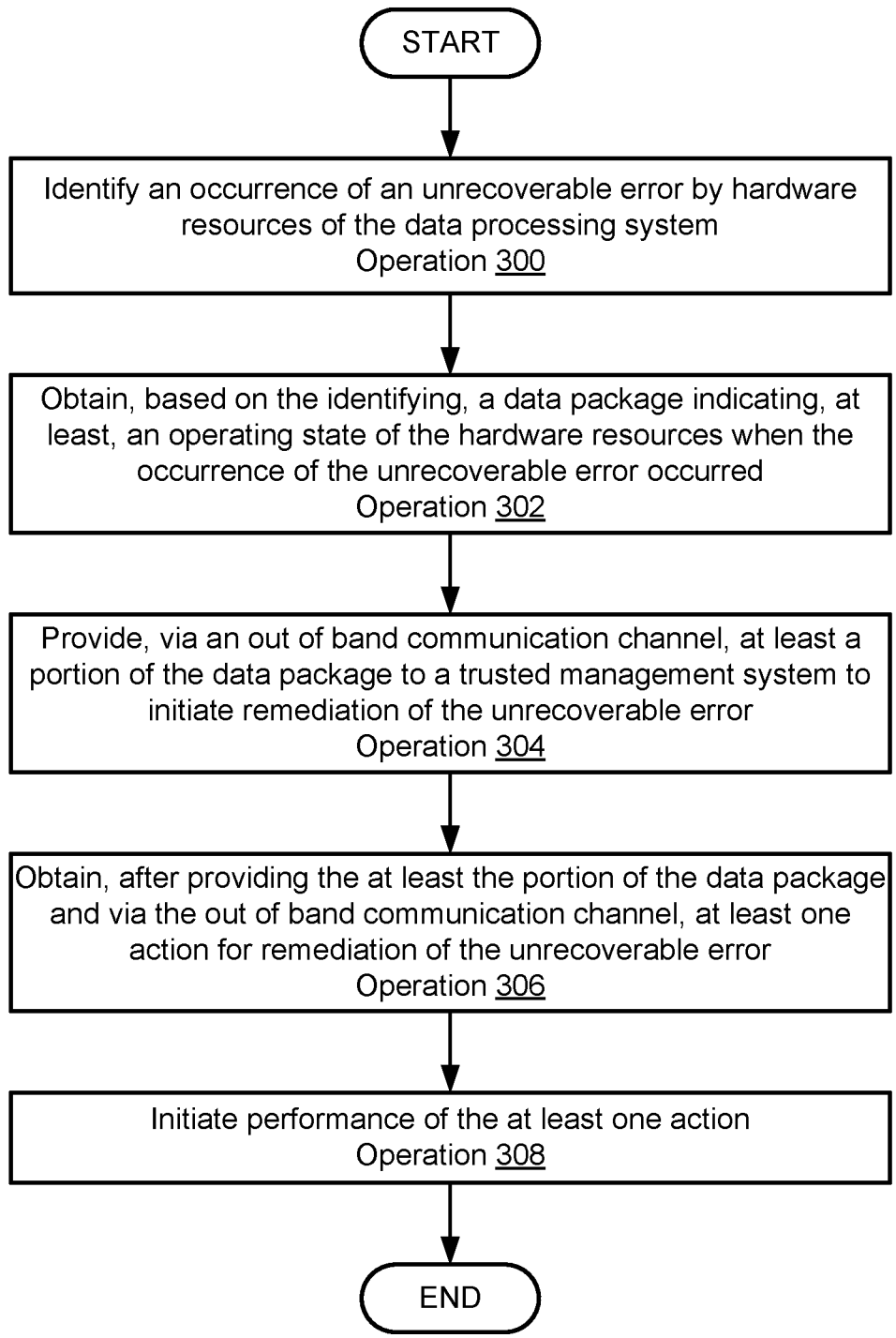
FIG. 3 shows a flow diagram illustrating a method of managing unrecoverable errors for a data processing system in accordance with an embodiment.

When providing its functionality, management controller 152 may perform all, or a portion, of the methods and operations illustrated in FIGS. 2-3.

While illustrated in FIG. 1B with a limited number of specific components, a system may include additional, fewer, and/or different components without departing from embodiments disclosed herein.

Turning to FIG. 1C, to provide computer-implemented services, hardware resources 150 may host applications 193 and management entities 194. Management entities 194 may include, for example, drivers, operating systems, and/or other entities that facilitate operation of applications 193 by facilitating use of hardware components 190. Hardware components 190 may include processors, memory modules, storage devices, and/or other types of hardware components usable to provide computer-implemented services.

Applications 193 may provide any quantity and type of computer-implemented services using hardware components 190. When operating, applications 193 may use abstracted access to the functionality of hardware components 190 provided by management entities 194. For example, the applications may make calls to an operating system which in turn makes calls to drivers which in turn communicate with the hardware components to invoke their various functionalities.

In an embodiment, hardware resources 150 also hosts abstraction layer 191. Abstraction layer 191 may include software such as hypervisors, dockers, and/or other entities that provide abstracted access to hardware components to various abstracted environments (e.g., 192). The abstracted environments may include virtual machines, containers, etc. Through abstraction layer 191 and abstracted environments, hardware resources 150 may host various instances of management entities and applications that may utilize the functionalities of hardware components 190.

To facilitate cooperation between management controller 152 and hardware resources 150, hardware resources 150 may host management controller agent 195. Management controller agent 195 may be independent from the abstracted environments, and may facilitate communication with and performance of instructions by management controller 152.

For example, management controller agent 195 may include functionality to (i) monitor various abstracted environments, and components therein, (ii) identify operating states (e.g., nominal, stalled, in error of various levels of severity), (iii) obtain information regarding the states of the environments such as, for example, content of virtualized memory, processors, logs of operation of various software and/or abstracted hardware components, (iv) write data to and/or otherwise communicate with the entities in the virtualized environments, (v) make modifications to the virtualized environment and/or entities hosted thereby through invocation of various functions of abstraction layer 191 and/or other entities, (vi) adjust distribution of use of hardware components 190 by the abstracted environment, and/or (vii) perform other types of management actions through which information regarding the operation of entities hosted by abstracted environment 192 may be collected.

Specifically, management controller agent 195 may notify management controller 152 (described in FIG. 1B) that one or more of management entities 194 has suffered an error (e.g., an unrecoverable error). Management controller agent 195 may also be responsible for generating a data package and providing the data package to management controller 152. The data package may include: (i) a snapshot of contents of memory of hardware resources 150, (ii) contents of a processor of hardware resources 150, (iii) at least one log of activity of hardware resources 150 prior to the occurrence of the unrecoverable error, and/or (iv) other data.

While illustrated in FIG. 1C with a limited number of specific components, a system may include additional, fewer, and/or different components without departing from embodiments disclosed herein.

As discussed above, the components of FIGS. 1A-1C may perform various methods to manage unrecoverable errors for data processing systems that perform computer-implemented services. FIGS. 2-3 may illustrate examples of methods that may be performed by the components of FIGS. 1A-1C. For example, a management controller similar to management controller 152 may perform all or a portion of the methods. In the diagrams discussed below and shown in FIGS. 2-3, any of the operations may be repeated, performed in different orders, and/or performed in parallel with or in a partially overlapping in time manner with other operations.

FIG. 2 shows a data flow diagram illustrating a management controller interacting with a trusted management system and hardware resources in accordance with an embodiment. The data flow diagram may illustrate management of unrecoverable errors for a data processing system similar to data processing system 140 described in FIGS. 1B-1C.

In FIG. 2, circles including numbers are used to indicate operations occurring at different points in time. For example, all operations described with reference to number one (1) may occur at a first point in time and all operations described with reference to the number two (2) may occur at a second point in time after the first point in time. While the operations are provided in an example temporal order (e.g., time point one before time point two), it will be appreciated that the operations may be performed in other orders from those illustrated and described herein.

Consider a scenario in which an unrecoverable error has occurred for hardware resources (e.g., hardware resources 200 shown in FIG. 2) of a data processing system. The occurrence of the unrecoverable error may cause a loss of functionality of software applications hosted by hardware resources 200 to an extent that a user of the data processing system may not access any information related to the unrecoverable error.

The unrecoverable error may occur due to: (i) an unexpected termination of a crucial process, (ii) a corrupted system file, (iii) misalignment of data usable by a BIOS for startup purposes, and/or (iv) other issues.

Management controller 204 may be similar to management controller 152 described in FIG. 1B. Management controller 204 may identify that the unrecoverable error has occurred by: (i) monitoring a startup process for the data processing system and identifying at least one unsuccessful attempt to restart the data processing system after the occurrence of the unrecoverable error, (ii) obtaining a message from agent 202 (e.g., similar to management controller agent 195 described in FIG. 1C), the message indicating that a management entity of hardware resources 200 has suffered the unrecoverable error.

Hardware resources 200 may be similar to hardware resources 150 described in FIGS. 1B-1C and the management entity may be an operating system running in a virtualized environment hosted by hardware resources 200 and may be similar to any of management entities 194 described in FIG. 1C. Agent 202 may be outside of the virtualized environment and, therefore, may not be compromised by the unrecoverable error.

At time point one (1), management controller 204 may obtain a data package from hardware resources 200 via side band communication channel 210. Side band communication channel 210 may be similar to any of sideband channels 174 described in FIG. 1B.

The data package may be generated by agent 202 and may include: (i) a snapshot of contents of memory of hardware resources 200, (ii) contents of a processor of hardware resources 200, (iii) at least one log of activity of hardware resources 200 prior to the occurrence of the unrecoverable error, and/or (iv) other data indicating an operating state of hardware resources 200 when the occurrence of the unrecoverable error occurred.

The snapshot of the contents of the memory may include contents of memory of hardware resources 200 before the unrecoverable error occurred. For example, the snapshot of the contents of the memory may include any amount of data used by management entities (e.g., management entities 194 described in FIG. 1C) to perform operations. The data included in the snapshot may be usable to identify recent events that have occurred and/or actions recently taken by the management entities.

The contents of the processor may include data related to all processes managed by the management entities hosted by hardware resources 200 at the time of the unrecoverable error (e.g., including program code) and/or may include any amount of memory usable by the management entities.

The at least one log of activity of the hardware resources may include data related to events and/or actions performed by the hardware resources. In addition, the at least one log may include telemetry data for the hardware resources (e.g., power consumption) at the time that the unrecoverable error occurred.

Management controller 204 may store a copy of the data package locally and/or may provide at least a portion of the data package to trusted management system 206 via out of band communication channel 208 as shown at time point two (2). Out of band communication channel 208 may be similar to channel 172 described in FIG. 1B.

As described in FIG. 1B, management controller 204 and a network module that manages communications sent and received via out of band communication channel 208 may be powered by a separate power domain than hardware resources 200. Therefore, if hardware resources 200 are unpowered, management controller 204 may be powered. Refer to FIG. 1B for additional details regarding power domains.

Trusted management system 206 may use the data package to identify one or more causes of the unrecoverable error and/or to generate a plan to remediate the one or more causes of the unrecoverable error.

At time point three (3), trusted management system 206 may provide instructions to management controller 204, the instructions indicating at least one action for remediation of the unrecoverable error. Management controller 204 may perform the at least one action and/or may instruct another entity (e.g., agent 202) to perform the at least one action.

The at least one action may include: (i) modification of at least a portion of data stored in storage of the data processing system, (ii) modification of at least a portion of program code for one or more software applications hosted by hardware resources 200, and/or (iii) other actions to selectively remediate the unrecoverable error.

By doing so, a source of the unrecoverable error may be diagnosed and may be remediated without loss of user configurations and/or other information that may be lost if multiple applications and/or the operating system was reinstalled.

In an embodiment, the one or more entities performing the operations shown in FIG. 2 are implemented using a processor adapted to execute computing code stored on a persistent storage that when executed by the processor performs the functionality of the system of FIGS. 1A-1C discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1A may perform various methods to manage data processing systems. FIG. 3 illustrates methods that may be performed by the components of FIGS. 1A-1C. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing unrecoverable errors for a data processing system in accordance with an embodiment is shown. The method may be performed, for example, by a management controller, and/or any other entity.

At operation 300, an occurrence of an unrecoverable error by hardware resources of the data processing system may be identified. Identifying the occurrence of the unrecoverable error may include: (i) identifying at least one unsuccessful attempt to restart the data processing system after the occurrence of the unrecoverable error, (ii) obtaining a message from an agent hosted by hardware resources of the data processing, the message indicating that a management entity of the hardware resources has suffered an unrecoverable error, and/or (iii) other methods.

Identifying the at least one unsuccessful attempt to restart the data processing system after the occurrence of the unrecoverable error may include: (i) monitoring a BIOS for the data processing system to identify logs of attempted restarts for the data processing system, the logs indicating whether the restart attempts are successful or unsuccessful, (ii) receiving a notification from another entity that there have been multiple unsuccessful attempts to restart the data processing system, and/or (iii) other methods.

Obtaining the message from the agent hosted by the hardware resources may include: (i) receiving, via a side band communication channel, the message from the agent in the form of a transmission, (ii) reading the message from storage (e.g., a storage architecture shared with the agent), and/or (iii) other methods.

At operation 302, a data package indicating, at least, an operating state of the hardware resources when the occurrence of the unrecoverable error occurred may be obtained based on the identifying. Obtaining the data package may include: (i) receiving, via a side band communication channel, the data package in the form of a message from a software agent hosted by the hardware resources, (ii) reading the data package from storage (e.g., a shared storage architecture that the software agent has access to), (iii) generating the data package, and/or (iv) other methods.

Generating the data package may include: (i) obtaining a snapshot of contents of memory of the hardware resources, (ii) obtaining contents of a processor of the hardware resources, (iii) obtaining at least one log of activity of the hardware resources prior to the occurrence of the unrecoverable error, (iv) compiling the snapshot, contents of the processor, and the at least one log of activity into a data structure and/or (v) treating the data structure as the data package.

At operation 304, at least a portion of the data package may be provided, via an out of band communication channel, to a trusted management system to initiate remediation of the unrecoverable error. Providing the at least the portion of the data package may include: (i) generating a message including the at least the portion of the data package, (ii) providing the message to network stack and/or driver to be subsequently transmitted in a packaged form to the trusted management system via the out of band communication channel, and/or (iii) other methods.

Providing the at least the portion of the data package may also include transmitting the at least the portion of the data package to trusted entity that is not the trusted management system, the trusted entity being responsible for providing the at least the portion of the data package to the trusted management system.

At operation 306, after providing the at least the portion of the data package, at least one action for remediation of the unrecoverable error may be obtained via the out of band communication channel. Obtaining the at least one action may include: (i) receiving a message from the trusted management system, the message being transmitted using the out of band communication channel to a network endpoint associated with the data processing system, (ii) extracting a payload from the message, (iii) reading the payload to obtain the at least one action, and/or (iv) other methods.

Obtaining the at least one action via the out of band communication channel may also include receiving the at least one action in the form of a message from an entity other than the trusted management system, the entity having previously obtained the at least one action from the trusted management system and the entity also being trusted by the trusted management system and the data processing system.

At operation 308, performance of the at least one action may be initiated. Initiating performance of the at least one action may include: (i) modification of at least a portion of data usable by one or more compromised management entities hosted by the hardware resources, (ii) modification of at least a portion of configuration settings usable by one or more management entities and/or applications during startup, (iii) providing instructions to one or more software agents to implement the at least one action, and/or (iv) other methods.

The method may end following operation 308.

Figure 4:
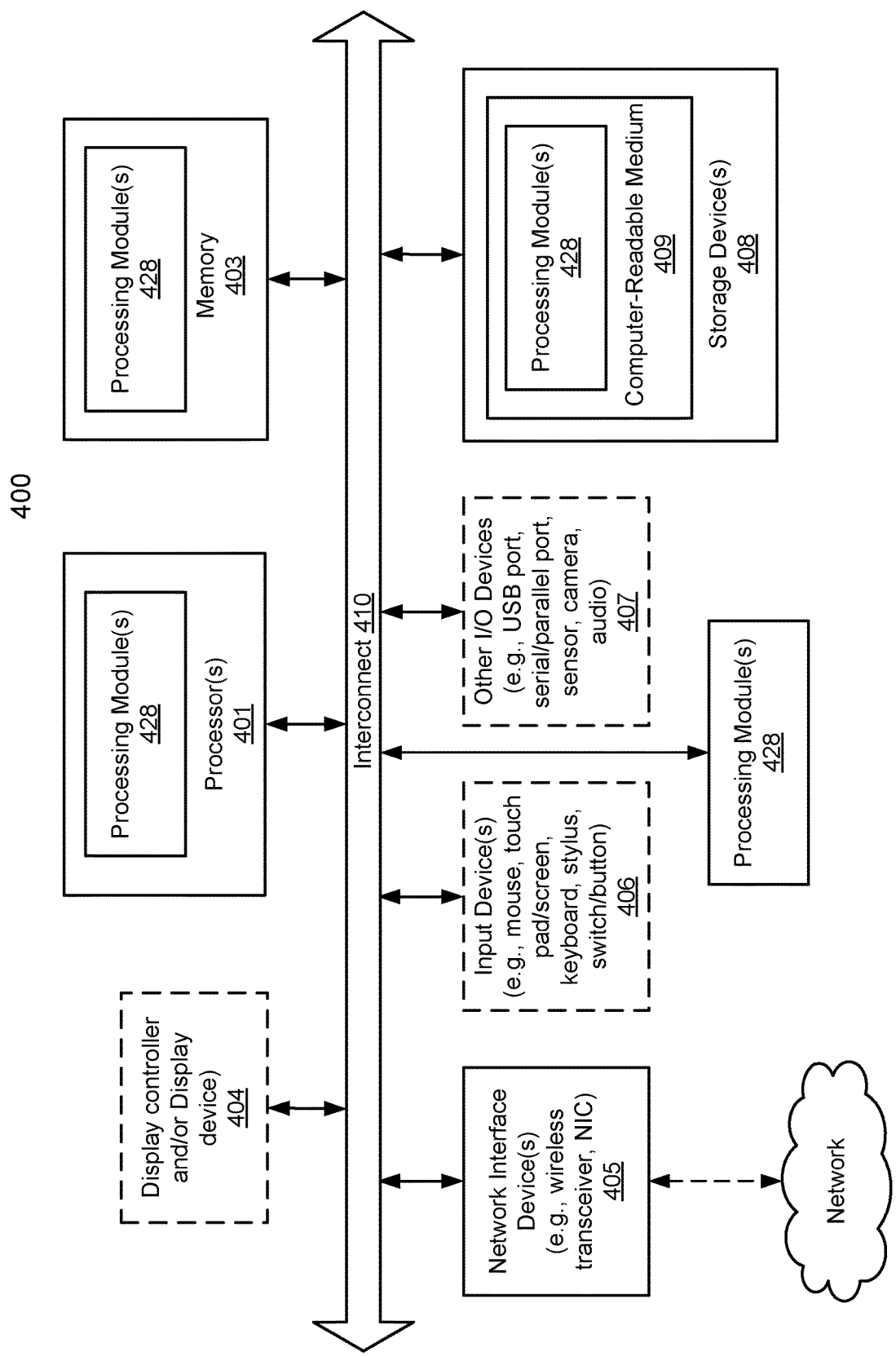
FIG. 4 shows a block diagram illustrating a data processing system in accordance with an embodiment.

Any of the components illustrated in FIGS. 1A-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a computer readable medium (namely, in a non-transitory computer readable medium). A machine-readable medium may include any mechanism for storing information in a form readable by a machine (e.g., a computer) in a transitory or non-transitory manner (e.g., the machine-readable medium may be implemented in the form of non-transitory media or transitory media, respectively). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing data processing systems, the method comprising:
    identifying, by a management controller of a data processing system of the data processing systems, an occurrence of an unrecoverable error by hardware resources of the data processing system;
    based on the identifying:
        obtaining, by the management controller and from the hardware resources, a data package indicating, at least, an operating state of the hardware resources when the occurrence of the unrecoverable error occurred; and
        providing, by the management controller and via an out of band communication channel, at least a portion of the data package to a trusted management system to initiate remediation of the unrecoverable error.

2. The method of claim 1, further comprising:
    after providing the at least the portion of the data package:
        obtaining, by the management controller and via the out of band communication channel, at least one action for remediation of the unrecoverable error; and
        initiating, by the management controller, performance of the at least one action.

3. The method of claim 1, wherein identifying the occurrence of the unrecoverable error comprises:
    identifying, by the management controller, at least one unsuccessful attempt to restart the data processing system after the occurrence of the unrecoverable error.

4. The method of claim 1, wherein identifying the occurrence of the unrecoverable error comprises:
    obtaining, by the management controller, a message from an agent hosted by the hardware resources, the message indicating that a management entity of the hardware resources has suffered the unrecoverable error.

5. The method of claim 4, wherein the management entity is an operating system running in a virtualized environment hosted by the hardware resources, and the agent is outside of the virtualized environment.

6. The method of claim 1, wherein the data package comprises:

a snapshot of contents of memory of the hardware resources; and contents of a processor of the hardware resources.

7. The method of claim 6, wherein the data package further comprises:

at least one log of activity of the hardware resources prior to the occurrence of the unrecoverable error.

8. The method of claim 1, wherein the data processing system comprises a network module adapted to separately advertise network endpoints for the management controller and the hardware resources, the network endpoints being usable by the trusted management system to address communications to the hardware resources and the management controller.

9. The method of claim 8, wherein the management controller and the network module are on separate power domains from the hardware resources so that the management controller and the network module are operable while the hardware resources are inoperable.

10. The method of claim 8, wherein the out of band communication channel runs through the network module, and an in band communication channel that services the hardware resources also runs through the network module.

11. The method of claim 8, wherein the management controller hosts a transmission control protocol/internet protocol (TCP/IP) stack to facilitate network communications via the out of band communication channel.

12. A non-transitory machine-readable medium having instructions stored therein, which when executed by a processor, cause the processor to perform operations for managing data processing systems, the operations comprising:

identifying, by a management controller of a data processing system of the data processing systems, an occurrence of an unrecoverable error by hardware resources of the data processing system;

based on the identifying:

obtaining, by the management controller and from the hardware resources, a data package indicating, at least, an operating state of the hardware resources when the occurrence of the unrecoverable error occurred; and providing, by the management controller and via an out of band communication channel, at least a portion of the data package to a trusted management system to initiate remediation of the unrecoverable error.

13. The non-transitory machine-readable medium of claim 12, further comprising:

after providing the at least the portion of the data package:

obtaining, by the management controller and via the out of band communication channel, at least one action for remediation of the unrecoverable error; and initiating, by the management controller, performance of the at least one action.

14. The non-transitory machine-readable medium of claim 12, wherein identifying the occurrence of the unrecoverable error comprises:

identifying, by the management controller, at least one unsuccessful attempt to restart the data processing system after the occurrence of the unrecoverable error.

15. The non-transitory machine-readable medium of claim 12, wherein identifying the occurrence of the unrecoverable error comprises:

obtaining, by the management controller, a message from an agent hosted by the hardware resources, the message indicating that a management entity of the hardware resources has suffered the unrecoverable error.

16. The non-transitory machine-readable medium of claim 15, wherein the management entity is an operating system running in a virtualized environment hosted by the hardware resources, and the agent is outside of the virtualized environment.

17. A data processing system, comprising:

a processor; and a memory coupled to the processor to store instructions, which when executed by the processor, cause the processor to perform operations for managing data processing systems, the operations comprising:

identifying, by a management controller of a data processing system of the data processing systems, an occurrence of an unrecoverable error by hardware resources of the data processing system;

based on the identifying:

obtaining, by the management controller and from the hardware resources, a data package indicating, at least, an operating state of the hardware resources when the occurrence of the unrecoverable error occurred; and providing, by the management controller and via an out of band communication channel, at least a portion of the data package to a trusted management system to initiate remediation of the unrecoverable error.

18. The data processing system of claim 17, further comprising:

after providing the at least the portion of the data package:

obtaining, by the management controller and via the out of band communication channel, at least one action for remediation of the unrecoverable error; and initiating, by the management controller, performance of the at least one action.

19. The data processing system of claim 17, wherein identifying the occurrence of the unrecoverable error comprises:

identifying, by the management controller, at least one unsuccessful attempt to restart the data processing system after the occurrence of the unrecoverable error.

20. The data processing system of claim 17, wherein identifying the occurrence of the unrecoverable error comprises:

obtaining, by the management controller, a message from an agent hosted by the hardware resources, the message indicating that a management entity of the hardware resources has suffered the unrecoverable error.

* * * * *